Oct. 4, 1955 R. A. RAMEY, JR 2,719,885

MAGNETIC AMPLIFIER WITH HIGH GAIN AND RAPID RESPONSE

Filed July 20, 1951 2 Sheets-Sheet 1

INVENTOR
ROBERT A. RAMEY, JR.

BY D. L. Snyder
Howard White
ATTORNEYS

INVENTOR
ROBERT A. RAMEY, JR.

BY
Howard White
ATTORNEYS

United States Patent Office 2,719,885

Patented Oct. 4, 1955

2,719,885

MAGNETIC AMPLIFIER WITH HIGH GAIN AND RAPID RESPONSE

Robert A. Ramey, Jr., Washington, D. C.

Application July 20, 1951, Serial No. 237,814

11 Claims. (Cl. 179—171)

(Granted under Title 35, U. S. Code (1952), sec. 266)

This invention relates in general to magnetic amplifiers and in particular to improvements in magnetic amplifier circuits to provide high power gain with rapid response time.

Magnetic amplifiers have been known for a number of years during a greater part of which little advance in this field has been made. Perhaps the primary reasons for the virtual discarding of magnetic amplifiers was the belief that thermionic amplifiers were superior in all respects and the fact that efficient materials suitable for magnetic amplifiers were not known or available. Accordingly thermionic amplifiers have reached a stage of development far ahead of magnetic amplifiers. Vacuum tubes are, however, a very undesirable component in certain systems, especially in industries where reliability and power are essential to maintain production. In more recent years it has become evident that magnetic amplifiers could be used to good advantage in many instances where vacuum tubes were previously thought to be indispensable. Also developments in other electrical fields produced high permeability magnetic alloys and dry-type rectifiers; materials applicable with great advantage to magnetic amplifier techniques to enhance the present day development of magnetic amplifiers.

In the present day electrical system, the magnetic amplifier finds utility as a sensitive robust galvanometer; a preamplifier for an electronic amplifier when the incoming signal is direct current to thereby function as a D. C.-A. C. converter; a mixing device and amplifier in a series system; a speed and frequency regulator; an instrument amplifier; a means to drive and control the reversal of an A. C. or D. C. motor; and probably of most importance to drive a motor at a speed dependent on the value of the input signal. Other uses for magnetic amplifiers are, of course, known.

The magnetic amplifier, however, is in a sense still in the developmental stage since all of its capabilities are not fully appreciated and further the known magnetic amplifiers have shortcomings and limitations that render them unsuitable to many applications. One of these limitations is encountered when it is desirous to have a rapidly responsive magnetic amplifier with a high power gain. The commercial magnetic amplifiers now available are suitable for purposes requiring either a rapid response time or a high power gain. To obtain the one, however, usually necessitates the sacrifice of the other.

The present invention teaches a new and improved magnetic amplifier circuit arrangement with a response time of approximately one cycle of applied voltage with high power gain.

Accordingly it is a primary object of the present invention to provide a new and improved magnetic amplifier having a rapid response time without sacrificing maximum power gain.

A further object of the present invention is to provide a magnetic amplifier wherein the control voltage does not supply the major power for amplifier control.

Another object of the present invention is to provide a magnetic amplifier wherein the average load current is substantially independent of variations in applied line voltage.

Still another object of the present invention is to provide a new and improved magnetic amplifier of simple design and readily constructable from conventional components.

Further objects and attainments of the present invention will become apparent from the following detailed description when taken in conjunction with the drawings in which.

In accordance with the spirit and scope of the present invention a magnetic amplifier circuit arrangement is provided wherein the control source voltage is not dependent upon for supplying the power for the amplifier control as generally provided in known magnetic amplifier circuits. In the preferred embodiments of the present invention the energy storage in the amplifier cores in steady-state operation is supplied entirely by the alternating current power source. Accordingly, the basis of the present invention is predicated on the theory that the magnetic amplifier circuit is a voltage-sensitive device and not, as commonly believed with respect to prior magnetic amplifiers, a current-sensitive device. Results obtained from embodiments constructed in accordance with this theory have produced a magnetic amplifier having a response time in order of one cycle of the applied voltage with high power gain.

The operation of magnetic amplifiers is well known in the art and the literature is replete with references of magnetic amplifiers or saturable reactors as they are sometimes known. However, in the numerous references certain assumptions were generally made and again certain known functions were commonly regarded as being negligible and accordingly regarded as inconsequential with respect to the operation of the magnetic amplifier. Therefore, in order to fully understand the function and operation of the preferred embodiments of the present invention it may be best to give a simple and concise theoretical explanation of the operation of a conventional magnetic amplifier such as shown in Figure 1 to which reference may now be had.

Figure 1:
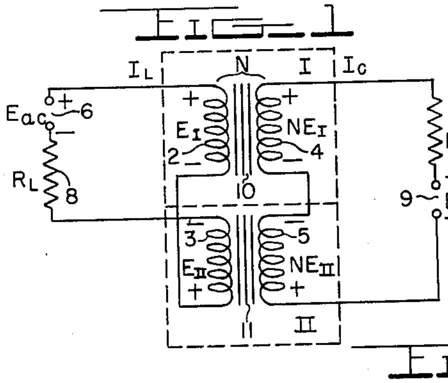
Figure 1 is a schematic circuit of a conventional magnetic amplifier included for purposes of understanding the circuits and advantages of the present invention.

The conventional series amplifier shown schematically in Figure 1 comprises a pair of single phase transformers I and II connected in series in the primary or "load" circuit 2 and 3 and energized from an A.-C. source 6 ($E_{ac}$) in series with a load circuit impedance 8. The secondary or "control" circuit has the two transformer secondaries 4 and 5 connected in series opposition (for A.-C. voltages of fundamental frequency) in series with a control circuit resistance 7 and a variable magnitude control voltage source 9.

In operation of the circuit of Figure 1, the governing equations are:

$$E_{ac}=E_I+E_{II}+I_LR_L \quad \text{(Primary circuit)} \quad (1)$$

$$NE_I=NE_{II}+E_c-I_cR_c \quad \text{(Secondary circuit)} \quad (2)$$

where $E_I$ and $E_{II}$ are the primary voltages on transformers I and II respectively $I_L$ and $I_c$ are the primary and secondary currents respectively and N is the ratio: secondary turns/primary turns.

During the periods of time in which transformer cores 10 and 11 are unsaturated simultaneously, currents $I_L$ and $I_c$ are assumed to be negligibly small. In these periods of non-conduction the circuit equations become from 1 and 2:

$$E_{ac}=E_I+E_{II} \quad \text{(Primary circuit)} \qquad (3)$$
$$NE_I=NE_{II}+E_c \quad \text{(Secondary circuit)} \qquad (4)$$

Whenever either transformer core is saturated the primary and secondary voltages of that transformer cease to exist and currents $I_L$ and $I_c$ can no longer be neglected. If core 10 is saturated the circuit equations become from (1) and (2):

$$E_{ac}=E_{II}+I_LR_L \quad \text{(Primary circuit)} \qquad (5)$$
$$0=NE_{II}+E_c-I_cR_c \quad \text{(Secondary circuit)} \qquad (6)$$

The output current $I_L$ must equal the reflected control current $NI_c$ for core 11 remains unsaturated and can have no net ampere turns beyond that needed for magnetization. If core 11 is saturated (negative half-cycle of A.-C. voltage) the circuit equations become from Equations 1 and 2:

$$E_{ac}=E_I+I_LR_L \quad \text{(Primary circuit)} \qquad (7)$$
$$0=NE_I+E_c-I_cR_c \quad \text{(Secondary circuit)} \qquad (8)$$

where $I_L$ equals $(-)NI_c$.

Elimination of $E_{II}$ from Equations 5 and 6 gives:

$$\left(E_{ac}+\frac{E_c}{N}\right)=\left(\frac{R_c}{N^2}+R_L\right)I_L \qquad (9)$$

From this relation it is apparent that the output current will lag the A.-C. voltage by a phase angle dependent upon the voltages $E_{ac}$ and $E_c$ when $E_c$ is a constant D.-C. voltage. In addition the magnitude of the output current is partially dependent upon the magnitude of control voltage $E_c$. The phase lag may be eliminated by utilization of a rectified A.-C. voltage for $E_c$ which frequency and phase is the same as that of the A.-C. source. This type of control voltage is conventional and is almost indistinguishable from D.-C. control with the same average voltage.

The conducting period is herein defined as that period which begins when one of the cores saturates; the non-conducting period beginning when the A.-C. voltage reaches zero.

At the no-load condition, ($E_c=0$) sufficiently long after application of the A.-C. voltage $E_{ac}$ so that all transients due to the application of A.-C. voltage have ceased to exist, the amplifier is operating according to Equations 3 and 4 with $E_I=E_{II}$, $E_c=0$ and both $E_I$ and $E_{II}$ simultaneously equal to ½ $E_{ac}$. Since the two cores 10 and 11 are identical and the two transformers are in series the magnetizing currents are identical and flow in the primary circuit.

Figure 2:
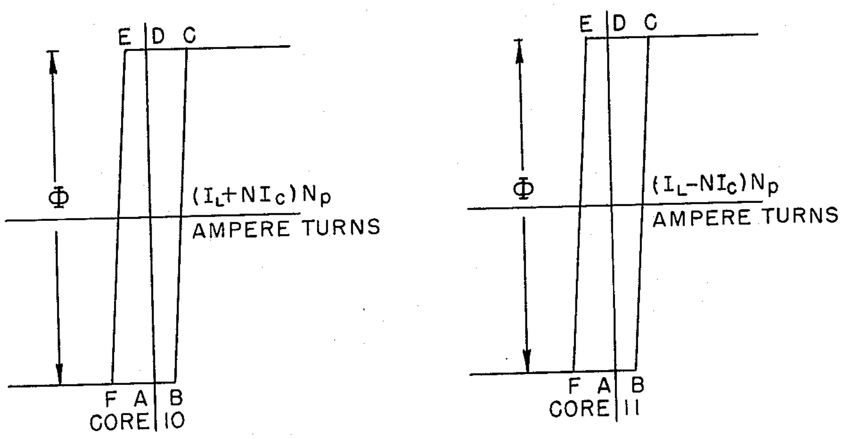
Figure 2 shows a pair of "ideal" magnetization loops of a conventional amplifier such as shown in Figure 1.

Referring now to Figure 2 there is illustrated the magnetization loops of cores 10 and 11 using the conventional variables as coordinates. It should be noted that the ampere turns (abscissa) are referred to the primary windings and as the transformers are connected in series, the magnetization loops must be considered dependently. Thus, as the secondary winding are connected in series opposition, the reflected control circuit current ($NI_c$) for one of the transformers will be of opposite sign from the reflected control circuit current ($-NI_c$) of the other transformer as indicated in Figure 2.

The flux $\Phi$ in the cores swings from knee to knee on the magnetization curves 90° behind the A.-C. voltage wave (i. e. maximum flux deviation at zero applied voltage) and the magnetization current is exactly that indicated by the magnetization loops. When $E_{ac}$ is zero and going positive the line current is zero and the fluxes in the cores are at points A. Subsequently, the A.-C. voltage becomes positive, the current $I_L$ assumes the value at B and continues to increase according to the magnetization loop (proportional to $\Phi$) until $E_{ac}$ approaches zero at C and becomes zero at D. During the succeeding negative half-cycle the line current assumes the values at E, F, and when $E_{ac}$ becomes zero, A. Since the magnetization loops are identical, $I_L+NI_c$ and $I_L-NI_c$ are equal. Consequently, $I_c=0$ with $E_c=0$ no matter how "fat" the magnetization loop. Current $I_c$ can only flow when there is a difference in magnetization level between the two cores. The magnetization currents are carried by the primary circuit as the quiescent current.

The exact insant of application of $E_c$ will be designated as point A, when $E_{ac}$ is zero and $$\frac{dE_{ac}}{dt}$$

is positive—the beginning of a non-conducting period. Time will be called zero at this instant and will attain a value ½$f$ second at the end of the half-cycle; at the beginning of each half-cycle time measurement will be zero.

Equations 3, 4, 5, 6, 7 and 8 show the voltage and current relations existing in the simple series magnetic amplifier in non-conducting and conducting states. From these equations expressions for the magnitudes of the magnetizing voltages $E_I$ and $E_{II}$ may be derived.

Either core proceeding to saturation will have:

$$|E_I|=|E_{II}|=\tfrac{1}{2}\left[|E_{ac}|+\frac{|E_c|}{N}\right] \text{ volts} \qquad (10)$$

across its primary terminals in such a direction as to produce the desired saturation.

Either core deviating from saturation during non-conducting period will have:

$$|E_I|=|E_{II}|=\tfrac{1}{2}\left[|E_{ac}|-\frac{|E_c|}{N}\right] \text{ volts} \qquad (11)$$

Either core deviating from saturation during a conducting period will have:

$$|E_I|=|E_{II}|=\frac{|E_{ac}|-\dfrac{NR_L|E_c|}{R_c}}{1+\dfrac{N^2R_L}{R_c}} \text{ volts} \qquad (12)$$

across its primary terminals in the appropriate direction.

As the magnetic amplifier is transient by nature a discussion of transient operation will aid in the understanding of the amplifier generally as well as of the time response characteristics.

During the first half-cycle of A.-C. voltage immediately following the application of $E_c$ Equations 3 and 4 are applicable and will remain effective until one of the cores reaches saturation. This will occur at a time $t_1$ defined by the relation:

$$\int_0^{t_1} E_I dt=\Delta_0=\tfrac{1}{2}\int_0^{\frac{1}{2}f} E_{ac}dt \text{ volt-seconds}$$

In the interval $t_1$ to ½$f$ a period of conduction follows during which the voltage across transformer 1 ($E_I$) is zero and the currents $I_L$ and $I_c$ are determined by Equations 5 and 6. Core II then has $E_{II}$ across its terminals causing it to deviate from its saturated value by an amount:

$$\Delta_1=\int_0^{t_1} E_{II}dt+\int_{t_1}^{\frac{1}{2}f} E_{II}dt \text{ volt-seconds}$$

During the second (negative) half-cycle of A.-C. supply voltage core II will saturate at a time $t_2$ defined by:

$$\int_0^{t_2} E_{II}dt=\Delta_1 \text{ volt-seconds}$$

which is the volt-seconds absorbed during the previous half-cycle. After saturation $E_{II}$ becomes zero and there follows a conduction period until the A.-C. voltage again reaches zero.

Core I meanwhile has $E_I$ across its terminals causing it to deviate from its saturated value by:

$$\int_0^{t_2} E_I dt + \int_{t_2}^{\frac{1}{2}f} E_I dt = \Delta_2 \text{ volt-seconds}$$

Therefore, during the third (positive) half-cycle, the initial conditions have changed in that core I is $\Delta_2$ volt-seconds from saturation rather than $$\tfrac{1}{2}\int_0^{\frac{1}{2}f} E_{ac} dt \text{ volt-seconds}$$

Saturation will now occur at time $t_3$ defined by:

$$\int_0^{t_3} E_I dt = \Delta_2 \text{ volt-seconds}$$

Stated more generally, saturation will occur in any odd $(n-1)$ half-cycle at time $t_{(n-1)}$ defined by:

$$\int_0^{t_{m-1}} E_I dt = \Delta_{n-2} \text{ volt-seconds}$$

During succeeding even ($n$th) half-cycles saturation will occur at time $t_n$ defined by:

$$\int_0^{t_m} E_{II} dt = \Delta_{n-1} \text{ volt-seconds}$$

or:

$$\int_0^{t_m} E_{II} dt = \int_0^{t_{m-1}} E_{II} dt + \int_{t_{m-1}}^{\frac{1}{2}f} E_{II} dt$$

As $E_I$ and $E_{II}$ have the same magnitudes during each respective part of a half-cycle, a general expression defining $t_n$ for any $n$th half-cycle is found by substituting in the above expression the values obtained in Equations 10, 11 and 12. After evaluating the integrals and solving the resultant equation in terms of the saturation angle $\theta_n = \omega t_n$ is:

$$\cos \theta_n = 1 - f_1(E_c) + f_2(E_c) \cos \theta_{n-1} \qquad (13)$$

It is seen that the saturation time or "firing angle" of the conventional amplifier is directly determined by the previous saturation time and the magnitude of the control voltage $E_c$.

From Equations 9 and 13 the transient and steady state current can be shown to be:

$$I_{L(\text{ave})} = f_3(Ec)[1 + \cos \theta n] \qquad (14)$$

The transient output current can be constructed as a function of time after application of a signal voltage. Current "firing" will occur in any $n$th half-cycle at the time $t_n$ and the current will have instantaneous values determined by Equation 9 for the remaining part of the half-cycle. The angle at which saturation occurs will change according to Equation 13 until such time as $\theta_n$ equals $\theta_{n-1}$; this will be the steady-state condition. The "response time" could be defined as that number of cycles needed for the firing angle to reach some predetermined part of its final value.

The preceding analysis has been predicated on only one basic assumption i. e., that the transformer cores saturate completely at a very low value of magnetizing current. The use of a rectified sinusoidal control voltage is hardly an assumption but rather a recognition of existing practice.

In the previous analysis the control current during non-conduction was considered to be such a small quantity that its existence did not affect the voltage relations. During the conducting period the current in the control circuit (determined by Equation 9) differed from the output current in magnitude only by the negligibly small magnetizing current. It is readily apparent from these considerations that the major need for power from the control source occurs during the conducting period.

During the non-conducting period the flux level in the two cores is altered. One core goes through its complete flux change (Equation 10) to saturation while the other core deviates from its saturated value according to Equation 11. During the conducting period the flux in the unsaturated core deviates further from saturation according to Equation 12.

Figure 3:
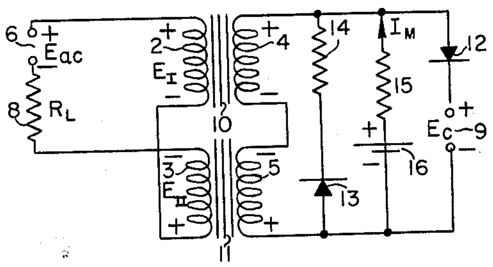
Figure 3 is a schematic circuit of a series magnetic amplifier illustrating the principles of the present invention.

Referring now to Figure 3 there is illustrated the series magnetic amplifier of the present invention comprising a primary circuit having a pair of single phase transformer primaries 2 and 3 connected in series and energized from an A.—C. source 6 in series with a load circuit impedance 8. The secondary circuit includes the two transformer secondaries 4 and 5 connected in series opposition (for A.-C. voltages of fundamental frequency). Connected in series opposition to the control voltage, between the positive terminal of the variable magnitude control voltage source 9 and the free end of transformer secondary 4, is an unilateral impedance element 12 shown as a rectifier. Connected in series across the two free ends of secondary transformers 4 and 5 is resistive element 14 and unilateral impedance element shown as rectifier 13. In parallel with elements 13 and 14 is the series connection of impedance element 15 and a constant voltage source 16.

The operation of the magnetic amplifier circuit of the present invention shown in Figure 3 is identical to the conventional magnetic amplifier during the non-conducting period but does not include the control voltage during the conducting period. Accordingly the instantaneous magnitude of output current is not a function of the control voltage. In order to eliminate the control voltage from the circuit during periods of conduction a unidirectional current flow element shown as rectifier 12 is connected in series opposition to the control voltage 9. It is understood that element 12 need not be limited to a rectifier but may be a vacuum or gas tube or any other such element known to those in the art. By having element 12 connected between the positive terminal of control voltage source 9 and the free end of transformer 4, flow of current from control source 9 is prevented. It is to be further understood that the control voltage $E_c$ is preferred to be full-wave rectified A. C. of the same frequency and phase as that of voltage source $E_{ac}$, although a direct-current source may be utilized, together with any suitable means for varying the magnitude thereof through the desired range.

During periods of non-conduction a minute value of current is required to flow in the transformers to furnish the constraint ordinarily imposed by the control voltage. This minute current is supplied from a "constant current" source which is shown parallel to the control voltage circuit and comprises in the preferred embodiment a high impedance, shown as resistance 15, and a voltage source 16 of sufficient size only to assure a current $I_M$ as large as the current needed for the control circuit's operation. It is understood of course that this minute current may be supplied by an external source or any other means known to the art.

A path for control-circuit currents during the conduction periods is provided through rectifier 13 and resistance 14 also shown in Figure 3 in parallel relationship to the control voltage circuit.

The equations governing the circuit of Figure 3 during non-conduction are (3) and (4), the same as those which governed the conventional series amplifier during non-conduction.

For the conducting period (core I saturated) the equation for the primary circuit is also the same (5) as that which governed the conventional series circuit whereas in the secondary circuit $E_c$ no longer appears, therefore:

$$0 = NE_{II} - I_c R'_c \text{ (Secondary circuit)} \qquad (15)$$

Elimination of $E_{II}$ from Equations 5 and 15 gives:

$$E_{Ac} = \left[\frac{R'_c}{N^2} + R_L\right] I_L \qquad (16)$$

Accordingly it is seen that the instantaneous magnitude of output current is no longer a function of the control voltage as in Equation 9. The control voltage may affect only the angle of firing.

An equation may be derived for the saturation angle $\theta_n$ of the present magnetic amplifier which equation would be similar in form to Equation 13 for the conventional amplifier. It is to be noted, however, that Equation 13 was derived in part from Equation 12 which no longer obtains in the analysis of the present amplifier. Specifically, in Equation 12 the term involving $E_c$ drops out because the control voltage is not effective during the conducting period. The resultant variation in terms in the equation for $\theta_n$ will express mathematically the improved time response characteristic of the present amplifier.

Figure 4:
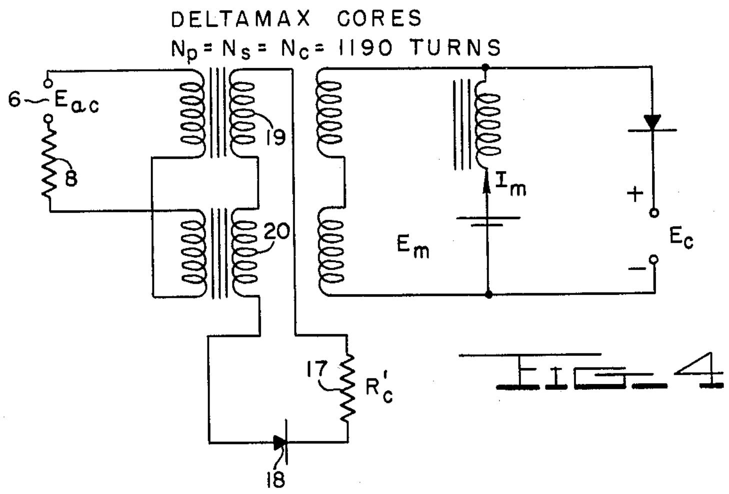
Figure 4 is a practical constructed embodiment of the series magnetic amplifier shown in Figure 3.

A series magnetic amplifier was constructed in accordance with the present invention, and is shown schematically in Figure 4 to which reference may be had. In the circuit of Figure 4 the alternating current voltage applied at terminals 6 was 125 volts R. M. S. at 60 C. P. S; the load circuit resistance 8 was 146 ohms; the resistance 17 was 35 ohms; and the constant current was equal to .00102 ampere. A choke may be provided to accomplish the function of resistance 15 of Figure 3 as illustrated in Figure 4. By so providing the constant-current voltage source $E_M$ can be reduced while yet supplying the constant current desired. The schematic circuit of Figure 4 is essentially the electrical equivalent as that shown in Figure 3, except that the path for control-circuit currents during the conduction periods is electrically isolated through the closed series circuit comprising tertiary windings 19, 20; rectifier 18 and resistance 17.

As indicated the number of turns of the various windings are equal. While any turns ratio may be utilized in practicing the instant invention, increasing to ratio of secondary to primary turns $$\left(\frac{N_s}{N_p}\right)$$

necessitates increasing the magnitude of control voltage $E_c$ if the full capabilities of the amplifier are to be realized.

Figure 5:
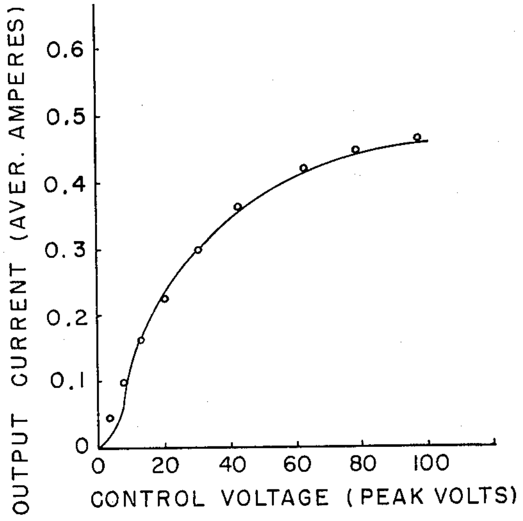
Figure 5 is a control voltage vs. output current graph of the series magnetic amplifier shown in Figure 4.

To verify the results of calculations with the equations previously given a series of transfer characteristics were calculated and compared with the results obtained from the circuit as shown in Figure 5.

Referring now to Figure 5 there are shown the plots of the control voltage versus output current of the transfer characteristics calculated and those experimentally obtained with the circuit of Figure 4. The encircled dots are representative of the calculated values whereas the solid line is representative of the values obtained experimentally. The closeness of the calculated and experimental values is obvious; further the calculated response time values on rise and decay were .9 and 1.25 cycles respectively and the experimental value was determined to be approximately one cycle each.

It is recalled that current flows through the control source only during non-conducting periods and the maximum value this current may have is determined by the constant current source. Assuming the magnetization loops are vertical and perfectly matched and the rectifiers have infinite inverse impedance the control current would be:

$$I_c=(-)\frac{I_M\theta_n}{\pi}\text{ average amps.} \qquad (17)$$

where $I_M$ is set experimentally at the lowest value which will assure full amplifier output.

Figure 6:
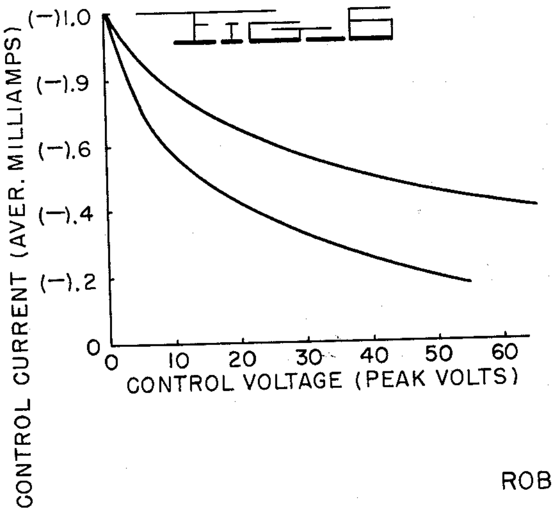
Figure 6 is a control voltage vs. control current graph of the series magnetic amplifier shown in Figure 4.

Using the expression above, the theoretical control current for the amplifier of Figure 4 (with $I_M$ equal to 1.02 milliamperes) was calculated and is shown in Figure 6 in comparison with the experimental results. The character of the two curves is essentially the same except that the experimental curve has a smaller magnitude.

The power amplification of the magnetic amplifier of the present invention is a most unusual function, complicated by the facts that no power is required from the control source (power must be absorbed instead) and that the control current magnitude is an inverse function of the control voltage and can be made to become zero at maximum output power by proper choice of $I_M$.

If power absorbed in the control source is considered as the input power and that absorbed by the load impedance the output power, the "gain" of the amplifier is then a function of the control voltage. A range of "gain" values (for the practical amplifier heretofore discussed) varies from only a few hundred at low control voltage to infinity at maximum power output with a response time of approximately one cycle. "Gain" at one-half maximum output power in the embodiment shown in Figure 4 was approximately 5000.

In summarizing the series magnetic amplifier circuit of the present invention the control source is not actively engaged in the magnetization of the transformer cores—it has rather assumed the function of a passive circuit which is used for a standard or measurement reference. The power needed for the operation of the amplifier has all been drawn from the major power sources—even that power needed for the measurement of $E_c$. The control circuit's maximum current $I_M$ is determined by the requirements of the cores and rectifiers and seems quite independent of the other parameters of the circuit. With appropriate materials and circuits it is readily conceivable that tremendous power gains may be obtained with a response time of one cycle.

Although certain specific embodiments have been shown and described many modifications and variations are possible without departing from the spirit of the present invention. Therefore, this invention is not to be limited except insofar as is necessary by the prior art and the scope of the appended claims.

The invention described herein may be manufactured and used by or for the Government of the United States of America for governmental purposes without the payment of any royalties thereon or therefor.

What is claimed is:

1. A magnetic amplifier comprising a pair of saturable magnetic cores each having wound thereon a load winding and a control winding, said load windings being connected in series additive and said control windings being connected in series opposition, a unidirectional current flow means connected in series with said control winding and poled to block current flow thereto from control voltages adapted to be applied to said control windings, and first and second circuits connected in parallel with said control windings, said first circuit including a constant current source for supplying a small value of current to said control windings, said second circuit providing a path for induced control-winding currents upon load current flow through said load windings.

2. A magnetic amplifier comprising a pair of saturable magnetic cores, a load winding and a control winding wound on each of said magnetic cores, the load windings being connected in series and the control windings being connected in series opposition, a constant polarity control voltage source, means connecting said source in series with said control windings including a unidirectional current flow means connected in series with said control voltage source and poled to block current flow therefrom, and first and second circuit means connected in parallel with said control windings, said first means including a constant current source for supplying a small value of current to said control windings, said second means providing a path for induced control-winding currents upon load current flow through said load windings.

3. A magnetic amplifier comprising a pair of saturable magnetic cores each having wound thereon a load winding and a pair of control windings, said load windings being connected in series additive and each of said control windings on one of said cores being connected in series opposition with a corresponding control winding on the other of said cores to form thereby three pairs of series-connected windings, a first control circuit including, one of the series pairs of control windings, a second control circuit including the other of the series pairs of control windings means in said first control circuit for providing a path for induced control winding currents, unidirectional current flow means in said second control circuit in series with said control windings and poled to block current flow thereto from control voltages adapted to be applied to said control windings, and a constant current source in said second control circuit for supplying a small value of current to said control windings.

4. A magnetic amplifier comprising a pair of saturable magnetic cores, a load winding and a control winding wound on each of said magnetic cores, the load windings being connected in series and the control windings being connected in series opposition, a series load circuit including said load windings, a load impedance and a source of alternating-current voltage, and a series control including said control windings, a constant polarity control voltage source, and a unilateral impedance coupling said control voltage source to said control winding and poled to prevent the flow of current from said control voltage source.

5. A magnetic amplifier comprising a pair of saturable magnetic cores, a load winding and a control winding wound on each of said magnetic cores, the load windings being connected in series and the control windings being connected in series opposition, a series load circuit including said load windings, a load impedance and a source of alternating-current voltage, and a control circuit including said control windings, first and second circuit means each connected in parallel with said control windings, said first means including a constant current source for supplying a small value of current to said control windings, said second means providing a path for induced control-winding currents, unilateral impedance means and a direct-current control voltage source in series with said control windings, said unilateral impedance arranged in said circuit to prevent current flow from said control voltage source.

6. A magnetic amplifier comprising a pair of saturable magnetic cores, a load winding and a control winding wound on each of said cores, the load windings being connected in series and the control windings being connected in series opposition, a load impedance coupled to said load windings, a source of alternating-current voltage coupled to said load windings and said load impedance, a variable control voltage source coupled to said control windings for controlling the transformed voltage division between said control windings, and unilateral impedance means coupled to said control voltage source and poled to block the flow of current therefrom to said control windings.

7. In a magnetic amplifier, a pair of saturable magnetic cores, a load winding and a control winding wound on each of said cores, the load windings being connected in series and the control windings in series opposition, a constant polarity control voltage source, and means connecting said source across said control windings including a unilateral impedance element in series with said source and poled to block current flow therefrom to said control windings.

8. In a magnetic amplifier having a pair of saturable magnetic cores, a load winding and a control winding wound on each of said cores, the load windings being connected in series and the control windings being connected in series opposition, means for connecting a control voltage source in series with said control windings and poled to block current flow thereto from control voltages adapted to be applied to said control windings, and a constant current source coupled to said control windings for supplying thereto a constant current substantially equal to the magnetizing current of said cores.

9. In a magnetic amplifier having a pair of saturable magnetic cores, a load winding and a control winding wound on each of said cores, the load windings being connected in series and the control windings being connected in series opposition, means for coupling a load impedance and an alternating voltage source in series with said load windings, means for connecting a variable control voltage source in series with said control windings including a unilateral impedance in series with said control windings and poled to block the flow of current thereto from control voltages adapted to be applied to said control windings, and a constant current source coupled to said control windings for supplying thereto a constant current substantially equal to the magnetizing current of said cores.

10. In apparatus for controlling the application of an alternating voltage to a load impedance coupled in series therewith, means for absorbing said alternating voltage for controlled portions of each half-cycle thereof including a pair of high remanence saturable magnetic cores each having a load winding and a control winding wound thereon, said load windings being connected in series and said control windings in series opposition, said load windings adapted to be connected in series with said alternating voltage and load impedance, the load windings being wound on said cores whereby the application of one half-cycle of said alternating voltage thereto causes one of said cores to proceed to saturation and the next half-cycle causes the other of said cores to proceed to saturation, means for controlling the firing time of the core proceeding to saturation in each half-cycle including a variable magnitude voltage source coupled in series with said control windings and operative to control the transformed voltage division between said control windings prior to core saturation, and a unilateral impedance connected in series with said variable source and said control windings and poled to block current flow from said variable source.

11. Apparatus for controlling the application of an alternating voltage to a load impedance coupled in series therewith comprising means for absorbing said alternating voltage during controlled portions of each half-cycle thereof including a pair of high remanence saturable magnetic cores each having a load winding and a control winding wound thereon, said load windings being connected in series and said control windings in series opposition, said load windings adapted to be connected in series with said alternating voltage and load impedance, the load windings being wound on said cores whereby the application of one half-cycle of said alternating voltage thereto causes one of said cores to proceed to saturation and the next half-cycle causes the other of said cores to proceed to saturation, means for controlling the firing time of the core proceeding to saturation in each half-cycle including a variable magnitude voltage source coupled in series with said control windings and operative to control the transformed voltage division between said control windings prior to core saturation, a unilateral impedance connected in series with said variable source and said control windings and poled to block current flow from said variable source, a constant current source coupled to said control windings for supplying thereto a constant current substantially equal to the magnetizing current of said cores, and means in parallel with said control windings for providing a path for induced control winding currents during each half-cycle after the firing time of said cores.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,584,856 | FitzGerald | Feb. 5, 1952 |